W. E. Derrick.
Grapple for Hay Forks.
No. 85,734.  Patented Jan. 12, 1869.
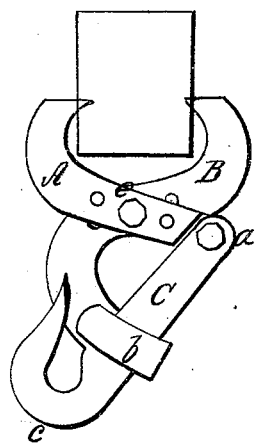
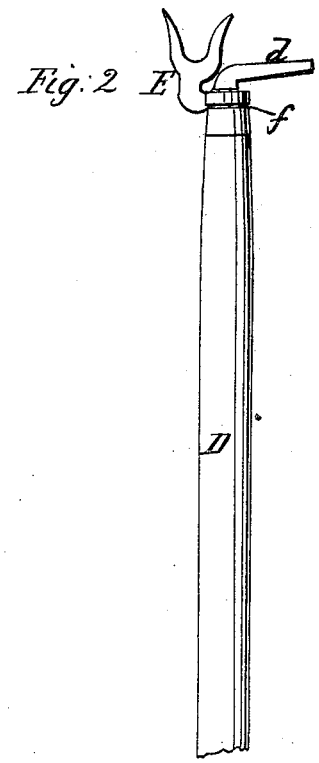
Witnesses:
Inventor:
Wm. E. Derrick

UNITED STATES PATENT OFFICE.

WILLIAM E. DERRICK, OF JORDAN, NEW YORK.

IMPROVEMENT IN GRAPPLES FOR SUSPENDING HORSE HAY-FORKS.

Specification forming part of Letters Patent No. 85,734, dated January 12, 1869.

*To all whom it may concern:*

Be it known that I, WILLIAM E. DERRICK, of Jordan, in the county of Onondaga and State of New York, have invented a new and Improved Grab or Claw for Suspending Horse Hay-Forks; and I do hereby declare that the following is a full, clear, and exact description thereof, which will enable those skilled in the art to make and use the same, reference being had to the accompanying drawings, forming part of this specification, in which—

Figure 1 is a side of my improved claw; and Fig. 2 shows a device to be used in connection therewith, for elevating the claw and placing it in position on the rafters, or for removing it therefrom.

In filling a hay-loft with a horse hay-fork the upper pulley-block of the fork has to be changed about to a different part of the loft when one part has become filled, and as these changes have to be made frequently the lashing or fastening of said block to different parts of the loft is the occasion of considerable labor and loss of time. To obviate this trouble and loss of time I provide a self-acting claw or pair of jaws, which, by the weight of the hoisting-tackle, is made to bite upon a rafter or other timber, and serve as a means of suspending the block or tackle, in such manner that it may be detached and removed to another position with the greatest facility. This claw and its elevating device are constructed as follows:

In the accompanying drawings, A B are a pair of jaws, which are pivoted to each other at $e$. The jaw A has an arm, $a$, extending beyond the pivot $e$, to which is pivoted a hooked bar, C $c$. The jaw B has also an arm extending down below the pivot $e$, and this arm terminates in a hook or loop, $b$, in which rests the bar C. The weight of the tackle on the hook $c$ draws the arm $a$ down, the bar C sliding downward in the loop $b$, and at the same time the bar C presses into the loop $b$, and in this manner both the jaws are acted upon and made to seize the rafter or other timber.

The arms A B are each provided with a series of holes for the passage of the pivot $e$. Thus the device is rendered adjustable. The staff D is provided with a fixed arm, $d$, and also with an upright fork, E, which turns freely on the neck $f$ of the staff.

To elevate the claw into position the fork E is engaged with the pivot $e$, with the arm $d$ under the pivot $a$, and in this manner the claw is held open and elevated to the rafter. The staff D is then turned sufficiently to throw the arm $d$ out from under $a$, when the jaws bite on the rafter and the claw is secured thereto. To remove the claw the fork E is placed under the pivot or bolt $a$, and by pressing upward the jaws are opened and released at once. By these means I obtain for this purpose a very reliable and easily-operated device.

I am aware that adjustable automatic clutches for suspending horse hay-forks have been used before; and I am also aware that devices for raising and lowering such clutches have been employed. Therefore I do not claim such, broadly; but,

Having thus described my invention, what I claim as new, and desire to secure by Letters Patent, is—

1. The suspending-grab composed of the curved arms A B, both provided with a series of holes for the passage of the pivot $e$, and the hooked arm C, pivoted at $a$ to arm A, and resting in the support $b$, formed on arm B, all constructed, arranged, and operating as herein set forth.

2. Also, the device for raising and lowering the above-described grab, when used in connection with the latter, and when constructed as herein specified and shown.

The above specification of my invention signed by me this 22d day of October, 1868.

WILLIAM E. DERRICK.

Witnesses:
JAS. M. CLARK,
F. A. MORLEY.